UNITED STATES PATENT OFFICE.

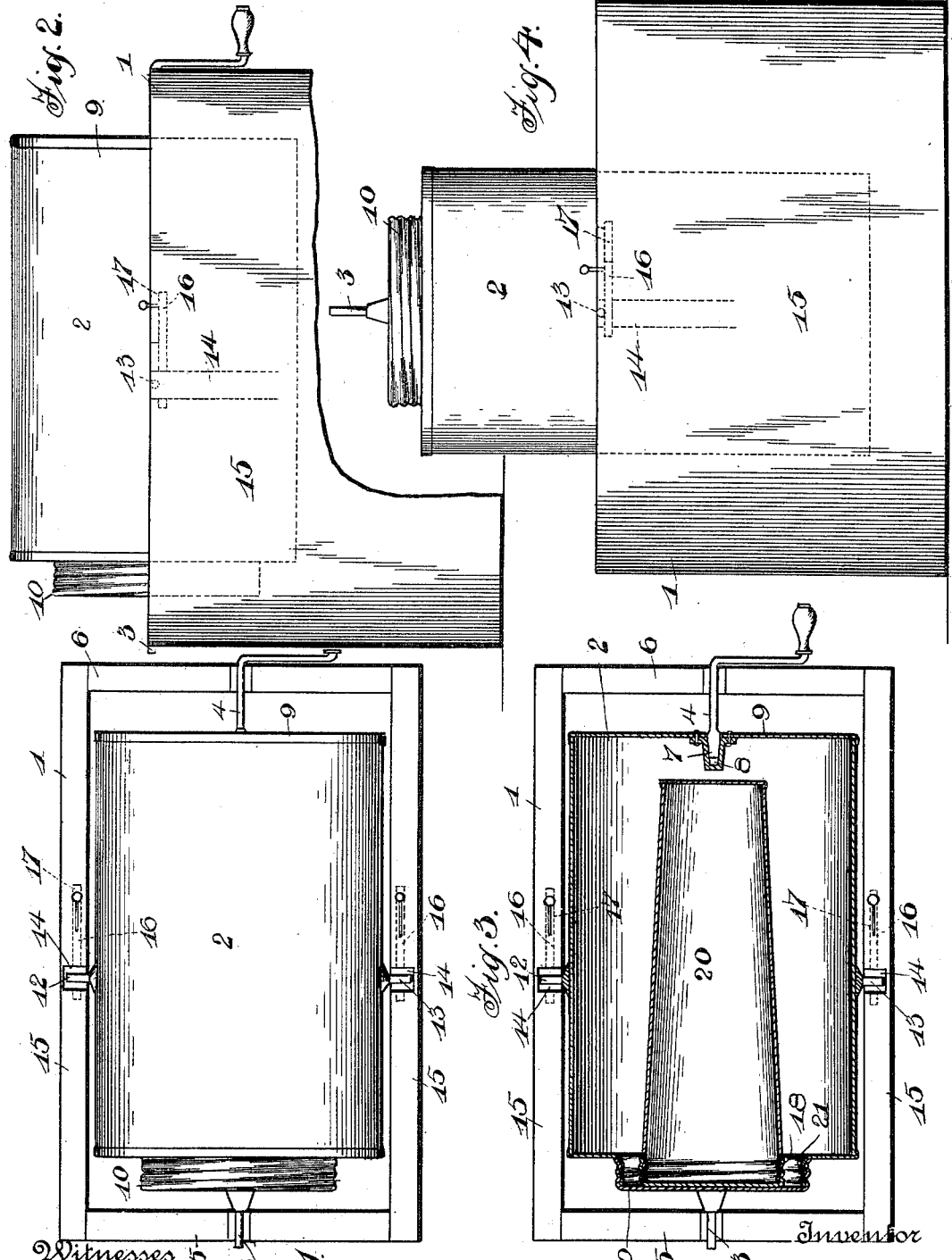

ANDREW T. BAGLEY, OF CAMARGO, ILLINOIS.

ICE-CREAM FREEZER.

SPECIFICATION forming part of Letters Patent No. 600,571, dated March 15, 1898.

Application filed August 25, 1896. Serial No. 603,872. (No model.)

*To all whom it may concern:*

Be it known that I, ANDREW T. BAGLEY, a citizen of the United States, residing at Camargo, in the county of Douglas and State of Illinois, have invented certain new and useful Improvements in Ice-Cream Freezers; and I do declare the following to be a full, clear, and exact description of the invention, such as will enable others skilled in the art to which it appertains to make and use the same.

My invention has relation to improvements in ice-cream freezers; and the object of the invention is to provide a cheap, simple, and efficient device of this class for household use.

To this end the novelty consists in the construction, combination, and arrangement of the same, as will be hereinafter more fully described, and particularly pointed out in the claim.

In the accompanying drawings the same figures of reference indicate the same parts of the invention.

Figure 1 is a top plan view of my improved ice-cream freezer. Fig. 2 is a side elevation of the same. Fig. 3 is a horizontal section, and Fig. 4 is a side elevation, of the position of the freezer when it is being charged.

1 represents the framework, and 2 is the freezing-cylinder, which is provided with a rigid trunnion 3 and a detachable trunnion 4, upon which the cylinder is longitudinally journaled in bearings in the end pieces 5 6 of the frame, and this trunnion terminates in a crank-handle by means of which the cylinder is rotated. The detachable trunnion 4 is formed with a square end 7, which fits in a corresponding socket 8 in the solid end 9 of the cylinder 2, and the opposite trunnion 3 is rigidly secured to a removable screw-cap 10.

12 13 represent the radial trunnions, secured to the outside of the cylinder 2, and when the cylinder is being rotated on its longitudinal trunnions 3 and 4 these radial trunnions 12 and 13 pass freely between the recesses 14 in the side pieces 15 of the frame.

16 16 represent bolts sliding in grooves 17 in the side, and when said bolts are shot forward they form bearings for the trunnions 12 13 to rest upon, and the detachable trunnion 4 may be withdrawn from its socket 8 and the freezing-cylinder 2 tilted on its radial trunnions 12 13 to assume the vertical position shown in Fig. 4, so that the screw-cap 10 may be removed to permit access to the interior of said cylinder.

18 represents a screw-socket on the inside of the removable cap 10, and it forms the airtight cover for the cream-reservoir 20. This reservoir is preferably cylindrical in cross-section and is cone-frustum shaped, the larger end to facilitate the removal of the frozen cream.

The operation of the device is very simple, and is as follows: The cylinder being in the vertical position, a freezing mixture, such as ice and sal-ammoniac or common salt, is placed in the cylinder. The cream being first suitably flavored and sweetened is placed in the reservoir 20 and the cap 10 fitted over it, so that the screw-socket 18 engages the threads on the mouth of the reservoir containing the prepared cream, and said cap is screwed down until the socket makes an airtight joint with the cream-reservoir, which is then placed in the cylinder containing the freezing mixture and the cap 10 screwed down tight on the threaded flange 21 of the cylinder 2. The cylinder is restored to its horizontal position, the square shank 7 of the crank-trunnion 4 inserted in the socket 8, and the bolts 16 16 withdrawn, which allows the cylinder and its contents to rest upon the longitudinal trunnions 3 4. The whole may then be rotated by means of the crank-handle on the trunnion 4 until the contents of the cream-reservoir are frozen, which I have found in practice to occur in about three or four minutes.

Having thus fully described my invention, what I claim as new and useful, and desire to secure by Letters Patent of the United States, is—

In an ice-cream freezer, the combination with the freezing-cylinder having a screw-threaded collar at its open end, of a screw-threaded cap engaged with and provided on its inner side with a screw-threaded socket of less diameter than the cap, and a cream-receptacle having a screw-threaded open end which is engaged and supported by said socket, substantially as shown and described.

In testimony whereof I hereunto affix my signature in presence of two witnesses.

ANDREW T. BAGLEY.

Witnesses:
J. W. WATSON,
W. C. WALLACE.